United States Patent
Holzer

[15] 3,638,794
[45] Feb. 1, 1972

[54] WATER SOFTENER
[72] Inventor: Walter Holzer, Meersburg, Germany
[73] Assignee: Holzer Patent AG, Zug, Switzerland
[22] Filed: Sept. 4, 1969
[21] Appl. No.: 855,335

[30] Foreign Application Priority Data
Sept. 5, 1968 Germany.....................P 17 92 469.5

[52] U.S. Cl.............................210/98, 210/136, 210/140, 210/264
[51] Int. Cl.......................................................B01d 35/12
[58] Field of Search...............210/25, 96, 30, 140, 191, 136, 210/264, 269, 142, 134, 341, 108, 102, 98

[56] References Cited
UNITED STATES PATENTS

| | | | |
|---|---|---|---|
| 3,154,484 | 10/1964 | Stoner | 210/264 X |
| 3,164,550 | 1/1965 | Lamkin | 210/264 X |
| 3,366,241 | 1/1968 | McMorris | 210/96 |
| 3,482,697 | 12/1969 | Tremont et al. | 210/140 X |
| 3,509,998 | 5/1970 | Pellett et al. | 210/136 X |

FOREIGN PATENTS OR APPLICATIONS

| | | | |
|---|---|---|---|
| 289,112 | 4/1928 | Great Britain | 210/102 |

*Primary Examiner*—Frank A. Spear, Jr.
*Attorney*—Jeffers and Rickert

[57] ABSTRACT

A water softener having two equal sized ion exchangers programmed with a regenerating unit so that one ion exchanger is regenerating while the other ion exchanger provides soft water. The two ion exchangers being so dimensioned that the time for the maximum production of soft water of one ion exchanger corresponds exactly to the time which is required to regenerate the other ion exchanger. The outlet of the regenerating unit is connected to each ion exchanger to give impulses to a program control unit to control the cycling of the water softener.

2 Claims, 1 Drawing Figure

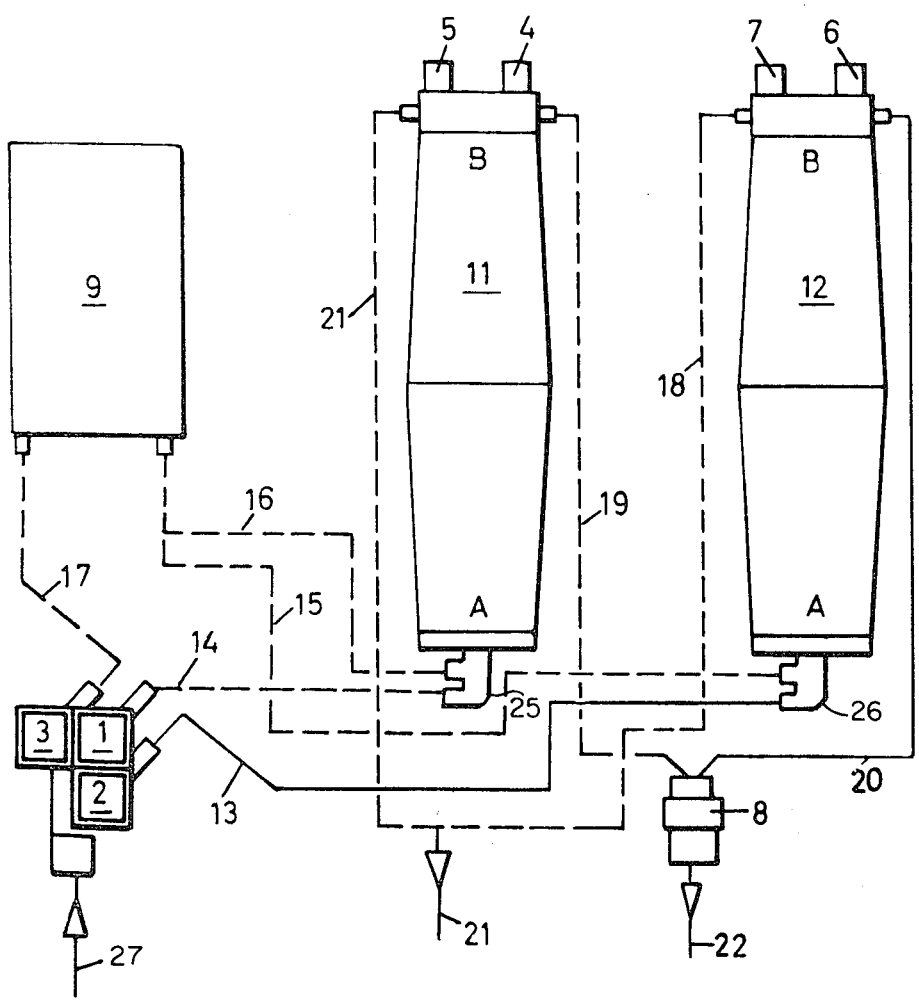

WATER SOFTENER

The invention covers a water softener with program-controlled ion exchanger and regenerating equipment.

For many years water softeners have played an important role in water preparation. With the use of water softeners in domestic appliances, such as for instance, washing or dishwashing machines, ion exchangers are used, which are capable of supplying soft water. The output of such ion exchangers is by nature limited. As soon as the capacity of the ion exchanger is reached, the filtering compound inside the ion exchanger can be regenerated. During regeneration it is not possible, however, to produce soft water. During the regeneration period the appliance, which has to be supplied with soft water, must consequently be at a standstill.

With many water softeners, the ion exchanger filtering compound is always regenerated overnight. It is true that the water softener is then always available again with its full capacity during the day, but this method has the disadvantage that regeneration is always carried out even when perhaps the output capacity of the ion exchanger has still not been reached at all. The result is a higher consumption of regenerating agent.

Another type of water softener proposed earlier has a device for the determining of the amount of soft water taken from the water softener. When the amount of soft water, which corresponds to the maximum output of the ion exchanger is reached, then the water softener is switched off and regenerated. With this method regeneration always takes place exactly at the time when the capacity of the ion exchanger is reached — but as a result of the sudden switching off of the water softener delays in production occur.

The production of a continuously operating water softener, which at the same time only needs a minimum amount of regenerating agent, for small appliances (for instance domestic ones) was hitherto faced with the difficulty that such softening devices were too expensive and also too large.

The task of the invention is to create a water softener which avoids the above-mentioned disadvantages of conventional or earlier proposed devices. The water softener should need as little regenerating agent as possible, and nevertheless be ready for use at any given time. It should be possible for it to be made small enough for it to be used for small appliances also, for instance, for domestic purposes.

In accordance with the invention this aim is achieved by providing two equal sized ion exchangers, one delivers soft water while the other regenerates, the ion exchangers are so dimensioned that the time taken for the maximum possible production of soft water of one ion exchanger corresponds exactly to the time needed to regenerate the other ion exchanger.

The water softener in accordance with the invention has the advantage that it is always ready for use, and that this readiness for use is not impaired by inserted regenerating cycles. It is therefore possible to take water from the water softener continually. In addition to this advantage of the invention in comparison with conventional devices, it is possible to construct this water softener in a design suitable for small appliances because of its dimensioning and its simple design.

One development of the invention provides for the outlet of the regenerating agent tank to be constantly connected to both ion exchangers via lip valves.

In accordance with another feature of the invention, the delivered soft water is passed through a water gauge which transmits impulses to a program control unit which controls the water softener.

A further advantageous feature of the invention provides for the water gauge for the determination of the amount of soft water delivered by either ion exchangers to be connected to the two ion exchangers via two inlets.

The invention is explained in a construction example with the aid of a drawing. In the drawing:

FIG. 1 shows a diagrammatic view of the entire device.

Compared with hitherto conventional water softeners which had only one ion exchanger, this water softener has two ion exchangers 11, 12 (FIG. 1). The entire plant is controlled by means of a program control unit 10, whose electrical connections to the individual valves or water gauge 8 are not shown.

If now, for instance, soft water is to be taken from the ion exchanger 12, then a valve 2 opens and passes hard water from a hard water supply point 27 via a pipe 13 to the ion exchanger at point A. This hard water flows through the ion exchanger 12 in the direction A to B and leaves ion exchanger 12 through a valve 6 opened by the program control unit 10. The soft water thus obtained is conveyed via a pipe 20 to the water gauge 8, which in turn feeds the soft water to a soft water outlet 22.

During this taking of soft water from the ion exchanger 12, ion exchanger 11 is not in use. During this period its ion exchanger compound can be regenerated. For this purpose a valve 3 is opened, whereby fresh water is fed to a salt container 9 via a pipe 17. The brine produced in the salt container 9 leaves the salt container and enters the ion exchanger 11 at point A via pipe 16. So that the brine can flow into the ion exchanger 11, valve 5 fitted to this ion exchanger is opened, whereby the pressure, which is produced in the ion exchanger as a result of the brine flowing in, is withdrawn from the ion exchangor via pipe 21. Valve 3 only remains open for a relatively short period of time, indeed only long enough for the ion exchanger 11 to be completely filled with brine. Thereupon valves 3 and 5 are closed again and the brine can now react with the ion exchanger compound and regenerate it. After regeneration has been completed, valves 1 and 5 are opened, whereby fresh water flows into the ion exchanger at point A, and lye leaves it at point B via the opened valve 5 as well as pipe 21, flowing into a rinsing water drain. Now the ion exchanger is ready to supply soft water again.

During the entire regenerating process in ion exchanger 11, soft water can be prepared in the other ion exchanger 12. The soft water delivered by ion exchanger 12 and passing through water gauge 8 causes water gauge 8 to give impulses continually to the program control unit. After a certain number of impulses, the program control unit switches the ion exchanger off as supplier of soft water. The program control unit 10 is so designed that it switches the ion exchanger 12 off at precisely the same time as its capacity is exhausted. If the ion exchanger 12 is switched off by the program control unit 10, then valves 1 and 4 are automatically opened by the program control unit. As a result hard water can flow into ion exchanger 11 at point A, and soft water exists at B via the opened valve 4. This soft water reaches soft water outlet 22 via pipe 19 and water gauge 8.

While soft water is being taken from ion exchanger 11, ion exchanger 12 can, as described above, be regenerated.

In order to be able to construct the water softener as small as possible, it should be borne in mind that each of the two ion exchangers requires a certain regenerating time. If the time for the flowing in of the regenerating agent is disregarded, it may be assumed that the amount of the filtering compound in the ion exchanger does not effect the regenerating time. The two ion exchangers and their filtering compounds should be so dimensioned that the time taken for the production of soft water corresponds exactly to the regenerating time up to the exhaustion of the capacity of the filtering compound. This maximum charge of the filtering compound results in the smallest possible size for the ion exchanger and is thus the best possible solution of the problem.

The following example with actual figures explains the above-mentioned solution. For example, per minute 10 liters of water flows through an ion exchanger. If the regenerating time of the other ion exchanger is 12 minutes, then the one ion exchanger should be capable of supplying exactly 120 liters of water until its capacity is exhausted.

When the ion exchanger 12 is supplying soft water and at the same time ion exchanger 11 has to be prepared for regeneration, valve 3 is opened, whereby water flows into the salt container 9 via pipe 17. The brine flowing out of the salt container 9 will now be flowing into these two ion exchangers at the same time via pipe 16, as well as a nozzle 25 fitted to the ion exchanger 11 or via pipe 15 and a nozzle 26 fitted to ion exchanger 12. The brine actually arrives in the one ion exchanger 11, as valve 5 is opened on this, and the pressure produced in the ion exchanger can be discharged through pipe 21. The brine, should, however, not get into the other ion exchanger 12, from which soft water is taken. This is achieved, because pipe 15 in nozzle 26 discharges in a lip valve; as long as soft water is taken from ion exchanger 12, the pressure at the lip valve caused by the fresh water flowing through, causes the lip valve to remain closed, and as a result no brine can flow in. As pipe 16 also discharges in a lip valve fitted at nozzle 25, the blocking action of this lip valve also manifests itself here when soft water is taken from ion exchanger 11. It is obvious that with the aid of pressure reducer the pressure in the pipes is kept within such limits that the lip valves can also close securely.

I claim:

1. An ion exchanger water-softening system having program-controlled regeneration comprising:

first and second ion exchangers of substantially equal soft water supplying capacities and substantially equal regeneration times, each exchanger having a hard water inlet, a brine inlet, a soft water outlet and a drain outlet, said soft water outlets and said drain outlets being provided with remotely controllable valves;

a program control unit for controlling said system and causing regeneration of one of said ion exchangers while the other said ion exchanger is supplying soft water;

a source of brine;

means for measuring the volume of soft water withdrawn from said system and supplying signals to said program control unit indicative thereof;

a source of hard water responsive to said program control unit and comprising a plurality of remotely controllable valves adapted to supply hard water to said brine source and said hard water inlets, all said aforementioned valves being responsive to said program control unit; and means independent of the direct control of said program control unit and associated with each said brine inlet for supplying brine to the respective exchanger when and only when the respective exchanger has its drain valve open and its hard water inlet valve closed.

2. The system of claim 1 wherein said signals comprise a sequence of impulses and wherein said program control unit comprises means for counting said impulses, said program control unit effective upon receipt of a predetermined number of impulses to cause the most recently regenerated ion exchanger to begin supplying soft water and to cause the ion exchanger which had been most recently supplying soft water to be regenerated.

* * * * *